United States Patent
Gao et al.

(10) Patent No.: US 7,104,139 B2
(45) Date of Patent: Sep. 12, 2006

(54) SYSTEM AND METHOD FOR LOAD SENSING USING PIEZOELECTRIC EFFECT

(75) Inventors: Robert X. Gao, Amherst, MA (US); Szabolcs Sovenyi, Ann Arbor, MI (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 10/865,742

(22) Filed: Jun. 10, 2004

(65) Prior Publication Data

US 2005/0011277 A1 Jan. 20, 2005

Related U.S. Application Data

(60) Provisional application No. 60/477,263, filed on Jun. 10, 2003.

(51) Int. Cl.
*G01B 7/16* (2006.01)
*G01N 3/08* (2006.01)

(52) U.S. Cl. .................................................. 73/777
(58) Field of Classification Search ............. 73/788, 73/826–837, 777, 862.628, 862.68
See application file for complete search history.

(56) References Cited

U.S. PATENT DOCUMENTS

| | | | | |
|---|---|---|---|---|
| 4,467,271 A | * | 8/1984 | Ruckenbauer et al. ...... 324/727 |
| 4,671,124 A | * | 6/1987 | Seliga ...................... 73/862.53 |
| 4,683,967 A | * | 8/1987 | Hanatani et al. ............. 177/144 |
| 4,713,770 A | * | 12/1987 | Hayes et al. ................. 700/175 |
| 4,717,927 A | * | 1/1988 | Sato ............................ 347/10 |
| 4,729,459 A | * | 3/1988 | Inagaki et al. ........... 188/266.5 |
| 5,581,013 A | * | 12/1996 | Frederick ................... 73/11.03 |
| 5,736,630 A | * | 4/1998 | Welner ............................ 73/9 |
| 5,861,582 A | * | 1/1999 | Flanagan et al. ............. 73/1.13 |
| 6,223,138 B1 | * | 4/2001 | Raffius et al. ............... 73/1.15 |

FOREIGN PATENT DOCUMENTS

| JP | 01021237 A | * | 1/1989 |
|---|---|---|---|
| JP | 01021237 A | | 1/1997 |

* cited by examiner

*Primary Examiner*—Max Noori
(74) *Attorney, Agent, or Firm*—Reinhart Boerner Van Deuren s.c.

(57) ABSTRACT

System and method for measuring static load by using a piezoelectric load sensor with a feedback technique to compensate for the signal loss due to charge leakage, and therefore ensures measurement accuracy. The system is integrated with other structure, objects and devices to measure static loads applied to a mechanical shaft, in an on-line, in-process, quasi real-time fashion. The system can be used to measure static load and thus oversee an entire machine system or a manufacturing process.

24 Claims, 8 Drawing Sheets

SYSTEM AND METHOD FOR LOAD SENSING USING PIEZOELECTRIC EFFECT

This application claims priority benefit from provisional application Ser. No. 60/477,263 filed Jun. 10, 2003, the entirety of which is incorporated herein by reference.

The United States government has certain rights to this invention pursuant to Grant No. DMI-9624353 from the National Science Foundation to The University of Massachusetts.

BACKGROUND OF THE INVENTION

The present invention relates generally to force and strain sensors; more particularly to a system and method of measuring static load using the piezoelectric effect with a feedback technique to compensate for signal loss.

Static load measurement is widely used in industrial and commercial applications, from machine tools to transportation systems (e.g., trains, forklifts, trucks, cranes) to scales for postal, freight, or personal weighting purposes.

Various physical principles have been explored over the past few decades for static load measurement, resulting in sensors that either make use of simple structural deflection of certain mechanical elements (e.g., springs and balances) or are based on complex physical transduction mechanisms (e.g., magnetoelastic or optoelastic). In engineering practice, the most widely used, state-of-the-art sensors for static load measurement are the strain gauges.

A strain gauge functions as a resistive elastic sensor, the resistance of which varies as a function of applied strain. In other words, strain gauges relate to the deformation experienced by the strain gauge sensing elements (e.g. metallic wire or semiconductors) attached to a load-carrying structure to the mechanical loads applied to the structure, through changes in electrical resistance of the sensing elements. The advantage of a strain gauge-based sensing technique is that it can measure pure static load of low variation frequencies (down to the DC range) and provide a stable output in the form of an electronic voltage signal.

Strain gauge-based load measurement, however, has a number of drawbacks. For example, strain gauges need to be constantly powered, requiring a power source (e.g., by means of batteries or an external power supply). Typically, strain gauges are connected into a bridge circuit, for example a Wheatstone bridge circuit, in order to be functional. Such a requirement severely limits the flexibility of their applications in many manufacturing-related scenarios where space is restricted.

Another disadvantage of strain gauge-based load measurement is the difficulty in attaching the strain gauge sensors to an object or component to be measured. For proper functioning, the attachment of strain gauge sensors to the mechanical structure requires the use of special glues and meticulous, time-consuming manual processing to ensure proper bonding of the strain gauge sensors. Such glues have a limited fatigue life, and are sensitive to temperature variations. In addition, strain gauges themselves are sensitive to environmental influences (such as temperature, humidity, etc.), and therefore, require the use of sophisticated compensation electronics to maintain accurate measurement. Such a requirement increases the cost and space needed.

These drawbacks make it impractical and very difficult for strain gauges to be effectively integrated into a realistic machine environment for on-line, in-process static load measurement, especially under space constraints.

Alternatively, piezoelectric sensing devices (which provide mechanical load to electrical charge transduction) have been commercially available for many years. The wide bandwidth and fast response of piezoelectric materials make piezoelectric sensors especially suited for a measuring load that varies at high frequencies. However, because of the inherent problem of charge leakage resulting and the subsequent loss of information due to the non-infinite insulation resistance of the piezoelectric sensors, it has been traditionally considered impossible to use piezoelectric sensors for pure static load measurement.

It is accordingly an objective of the present invention to provide static load sensing based on the piezoelectric effect. It is yet another objective of the present invention to provide a measurement technique that utilizes a piezoelectric sensor for static load measurement purposes. Such an invention can include a feedback technique that compensates for the signal loss due to charge leakage, and ensure measurement accuracy. It is yet another objective to provide a "zero-line" as the reference base for absolute load reading.

The apparatus of the present invention can be of durable construction, requiring little or no maintenance over its operating lifetime. In order to enhance market appeal, such an apparatus should also be of inexpensive construction to afford broadest possible application. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. This invention provides a system and method for measuring and monitoring static load by using a piezoelectric load sensor. The present invention is capable of measuring static loads applied to a machine component and structure (e.g., a mechanical shaft), in an on-line, in-process, quasi real-time fashion. The piezoelectric load sensor system of the present invention can be structurally integrated into a variety of machine components and structures (e.g., rolling element bearings, machine frames, and suspension systems) that support an applied static load.

In part, the present invention is a system for measuring static load applied to a mechanical support. Such a system comprises: (1) a piezoelectric sensor for generating an analog electrical signal responsive to a static load on a mechanical support; (2) electronic circuitry coupled to the sensor for converting an analog electrical signal to a digital value indicative of the static load; and (3) a feedback circuit to account for signal decay over time. As discussed more fully, below, a feedback circuit can be coupled to the electronic circuitry and can apply a signal corresponding to the static load value to compensate for charge leakage. Piezoelectric sensors useful in conjunction herewith are known to those skilled in the art made aware of this invention, such sensors as can be dimensioned and configured comparably with various other circuit components.

In certain embodiments, the electronic circuitry comprises a processor, which further comprises an analog to digital converter, for converting an analog electrical signal to a digital value representative of an applied static load. Likewise, the electronic circuitry can comprise a comparator for detecting the analog signal produced by the sensor, and an integrator for integrating the signal over time. In such embodiments, the feedback circuit comprises a digital to analog converter for converting the digital value produced by the processor to an analog value, with a switch interposed between an output of the processor and an output of the integrator.

A reference source provides a reference or baseline voltage for the electronic circuitry. With coupling to the feedback circuit, the reference voltage can include a component responsive to the applied static load. A comparator defining upper and lower limit values for a generated analog signal can detect a change in applied load for a signal outside such limits.

With reference to the latter consideration, the present invention also provides a method for static load sensing. Such a method comprises: (1) providing a piezoelectric sensor responsive to a static load thereon, coupled to electronic circuitry for converting the sensor analog signal to a digital value, and producing a first reference voltage; (2) changing the static load on the sensor to generate a voltage responsive to such change; (3) comparing the generated voltage with predetermined upper and lower voltage values; and (4) applying the generated voltage to the first reference voltage and to the upper and lower voltage values.

Preferably, the generated voltage is integrated over time, and conversion thereof to a digital signal facilitates storage and display. Regardless, the generated voltage is compared, on the basis of amplitude or another suitable parameter, to the predetermined upper and lower voltage values. A generated voltage and corresponding analog signal outside such value indicates a change in static load, and generates a second reference voltage and corresponding second upper and lower voltage values for subsequent comparison upon further static load change.

The aforementioned sensing methodology can be effected in conjunction with a method to counter or compensate for signal decay. Such a method comprises (1) providing a piezoelectric sensor and/or system of the type described above; (2) changing the static load on the sensor to generate voltage responsive to the load change; (3) integrating the generated voltage and converting it to a digital value; (4) producing a feedback signal corresponding to the digital value; and (5) coupling the feedback signal to the integrated voltage. As discussed more fully below, the electronic circuitry can be operated in a measurement mode to convert an analog signal produced by the sensor to a digital value and/or operated in a storage mode to portray the digital value on a display unit. A feedback signal is coupled to the electronic circuitry, corresponding to the digital value and representative of the applied static load. Likewise, such a signal can be added to a reference voltage circuit and existing threshold limits, thereby providing a new reference and limits for comparison upon subsequent static load change.

The piezoelectric load sensor system can include electronic circuitry, a data visualization device, and a programmed microprocessor that controls the measurement and data display process. Electronic circuitry integrates a charge signal generated by a piezoelectric sensor when subjected to a static load, and converts the signal to an equivalent digital code. The peak value of the signal, which is a direct measure of the value of the static load to be measured, is then stored for reference. To compensate for a signal decay due to the non-infinite insulation resistance of the piezoelectric sensor and/or of the charge-holding capacitor in the circuit, the peak value of the signal is fed back to the output of a signal integrator via a digital-to-analog (D/A) converter, which is controlled by a microprocessor. A data visualization displays the static load value, and software codes in the microprocessor control the measurement and data display process.

In one aspect, the present invention provides a system for measuring and monitoring a static load applied to a machine component and/or structure in quasi real-time by using a piezoelectric load sensing circuit including a sensor for measuring a static load; an electronic circuitry for converting a signal produced by the sensor into a digital signal; a feedback circuit for compensating for signal loss from the sensor; zero-line circuitry for providing a reference base for an absolute load reading by the sensor; a microprocessor for controlling the measurement process; and a data visualization device for displaying the static load value, the microprocessor controlling the data display for the data visualization device.

In another aspect, the present invention provides a method of measuring load using a piezoelectric load sensor, the method includes the steps of providing a piezoelectric sensor for sensing an applied force; determining whether the applied force is changing at the piezoelectric sensor; shifting from a storage mode to a measurement mode if the applied force is changing; implementing a time delay until the applied force is stable; activating a feedback loop if the applied force is stable, the feedback loop compensating for signal loss; converting an analog signal from the piezoelectric sensor to a digital signal when the applied force is stable; and sending the digital signal to a microprocessor, the microprocessor controlling a data visualization device to present the data from the digital signal.

The method of the present invention provides a new measurement technique that utilizes a piezoelectric sensor for static load measurement purposes, a technique traditionally considered unsuitable and inapplicable. Since the piezoelectric sensor generates electrical charges when it is mechanically stressed, no separate power supply is required for the sensor to be functional, as opposed to strain gauge sensors. The measurement system can be miniaturized and integrated into various kinds of machine components (e.g., rolling element bearings for machine-integrated, on-line, in-process, quasi real-time measurements).

The present invention overcomes major limitations in the prior art by providing a feedback technique to compensate for signal loss due to charge leakage, and therefore ensures measurement accuracy. The piezoelectric load sensor and/or related circuitry of the present invention also provide a baseline reference for absolute load reading.

Measuring static load is of high relevancy to many industrial applications. For example, bearing end users and manufacturers have long been interested in knowing the static load applied to a machine during its operation. Similarly, it is of great relevancy to measure the static load in the gripper of a robot, to ensure adequate and proper holding of the object. The present invention provides a method of obtaining this information and may be used for a wide range of commercial applications (e.g., automotive, paper and pulp, transportation, machine tools, automated assembly line, etc.). Specifically, the present invention impacts the condition monitoring of machine components and the condition monitoring of mechanical systems and manufacturing processes. In addition, information about the static load applied to a machine during its operation will provide feedback for improved product life-cycle design.

In yet another aspect, the present invention provides a condition monitoring system to detect the outside effects on an object and report variations in the outside stimuli on the object, the system including a condition monitoring circuit for monitoring a component of a machine and being integrated therewith to function as a static load sensor, the condition monitoring circuit providing loading information for the machine component in a quasi real-time fashion; a diagnostic and monitoring circuit for self-diagnosing the component of the machine; and a feedback circuit for providing predictive maintenance for the component of the machine.

The condition monitoring aspect of the present invention enables integration into a machine component of a static load measurement function that provides accurate, realistic, and quasi real-time loading information for the component being monitored. Such a built-in load measuring technique is useful by way of realizing the next generation "smart" machine components that can self-diagnose their own working conditions for condition-based and predictive maintenance which helps reduce costly machine down-time and improve enterprise-wide decision making, scheduling, and productivity.

In addition to monitoring loading status on individual machine components, the present invention provides an integrated static load measurement system which can serve as a "smart" built-in monitor that oversees an entire machine system (e.g., multi-axis machine centers, power generators, off-highway trucks, excavators, railway trains or airplanes) or a manufacturing process (e.g., assembly line, chemical process, natural gas production, or oil refinery), thus improving the overall operation efficiency and safety.

With respect to product life-cycle design, historically, machine design and maintenance have been viewed as two separate functions dealing with separate, unrelated problems under different budgetary and operational constraints. The integrated load measurement system of the present invention can help bridge these two functional domains by establishing a better match between the actual loads and the load-carrying capabilities of the components, through selection of different product sizes, types, heat treatment methods, etc. For example, an overload detected during the applications by the integrated load measurement device can provide clues and suggest related solutions to flaws that can be traced back to the design, material selection, manufacturing, packaging, and transportation stages of the products (e.g., using a different steel alloy or adding ultrasonic inspection at the manufacturing stage). Succinctly, the present invention introduces a new application of the "intelligent" industrial applications, a step ahead of the "intelligent" machines.

To optimize advantages of the present invention for real-world applications, the present invention as a whole can be "miniaturized" so as to be structurally integrated into a small space within the load-carrying sections or components of the machine (e.g., a rolling bearing). However, miniaturization is not a prerequisite for the present invention to be applicable.

The piezoelectric load sensor system of the present invention is preferably of a construction which is both durable and long lasting, and which will require little or no maintenance over its operating lifetime. The piezoelectric load sensor is also, preferably, of inexpensive construction to enhance its market appeal. Finally, all of the aforesaid advantages and objectives of the present invention are achieved without incurring any substantial relative disadvantage.

DESCRIPTION OF THE DRAWINGS

These and other advantages of the present invention are best understood with reference to the drawings, in which.

DETAILED DESCRIPTION OF PREFERRED EMBODIMENTS

Various embodiments of this invention provide a system and method for measuring and monitoring static load by using a piezoelectric load sensor. The piezoelectric load sensor system and/or circuitry related thereto provides a feedback technique to compensate for the signal loss due to charge leakage, and therefore ensures measurement accuracy. The piezoelectric load sensor system of the present invention also provides a "zero-line" as the reference base for absolute load reading. Such a system can be used to measure static loads applied to a mechanical shaft, in an on-line, in-process, quasi real-time fashion. The inventive system can be structurally integrated, preferably through miniaturization, into a variety of machine components and structures (e.g., rolling element bearings, machine frames, and suspension systems) that support an applied static load.

The integration with machine components and mechanical systems impacts the condition monitoring of machine components, mechanical systems and manufacturing processes by providing accurate, realistic, and quasi real-time loading information for the integrated system. Such a built-in load measuring technique can be employed in or in the development of the next generation "smart" machine components that can self-diagnose their own working conditions.

Figure 1:
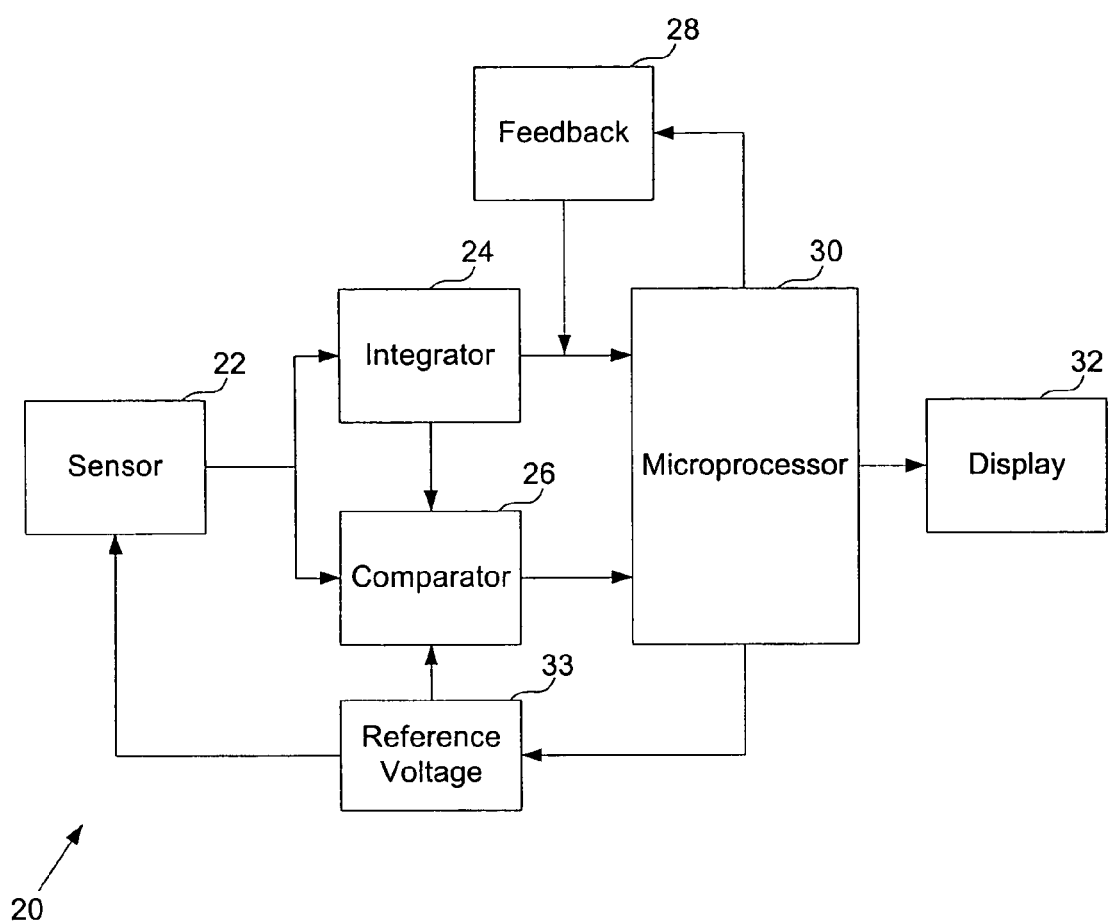
FIG. 1 is a block diagram of an embodiment of the piezoelectric load sensor system of the present invention, in accordance therewith.

Referring now to FIG. 1, there is shown a simplified block diagram of an embodiment of the present invention. In such embodiment, the piezoelectric load sensor system 20 includes a sensor 22, an integrator 24, a comparator 26, a feedback circuit 28, a microprocessor 30, a display 32, and a reference voltage circuit 33. The sensor 22 is a device that receives and responds to a signal or stimulus to provide an input signal for the integrator 24 which, in conjunction with the comparator 26, the feedback circuit 28, the microprocessor 30, and the reference voltage circuit 33 provides a measurement for the display 32. The output of the sensor 22 is commonly connected to the input of the integrator 24 and the input of the comparator 26. The output of the integrator 24 and the output of the comparator 26 are connected to the microprocessor 30. The microprocessor 30 is connected to the feedback circuit 28 to provide a feedback signal to the output of the integrator 24. Further, the microprocessor 30 controls the reference voltage circuit 33 for providing a zero-line voltage reference for the sensor 22. The microprocessor 30 is also connected to the display 32 for displaying the load measurement value received from the sensor 22.

Sensor 22 can respond to some kind of an input physical property (e.g., a load) and convert it into an electrical signal that is compatible with the piezoelectric load sensor system 20. In other words, generally, the sensor 22 can translate a non-electrical input into an electrical output signal that can be channeled, amplified, and modified by other electronic circuits and devices. The output signal of the sensor 22 may be generally in the form of an electrical charge, which may further be defined and described in terms of amplitude, frequency, and phase.

The sensor 22 is a part of a larger system, the piezoelectric load sensor system 20, which may include other detectors, signal conditioners, signal processors, memory devices, and actuators. In a preferred embodiment, without limitation, the sensor 22 is located at the input section of the piezoelectric load sensor system 20 to monitor outside effects and to produce a signal indicative of the variations in the outside load stimuli. Alternatively, the sensor 22 may be an internal part of a device or component and monitor the device's conditions. In a preferred embodiment, the sensor 22 operates in passive mode to directly generate an electrical signal in response to stimulus. The input stimulus energy is converted by the sensor 22 into output energy without the need for an additional power source. Referring still to FIG. 1, the output of the integrator 24 is the input signal from the sensor 22 integrated over time. The integrator 24 integrates the voltage across resistor R2 (FIG. 2) with respect to time and sends the result to the microprocessor 30 through a signal level conversion circuit.

The comparator 26 detects the change in the output signal, preferably voltage, of the sensor 22, caused by, for example, a change in static load. The feedback circuit 28 provides a closed-loop feedback system to compensate for signal loss and ensures measurement accuracy for the piezoelectric load sensor system 20 of the present invention. The microprocessor 30 is the processing unit of the piezoelectric load sensor system 20. In a preferred embodiment, the microprocessor 30 is fabricated on a single integrated circuit chip and contains the basic arithmetic, logic, and control elements of a computer that are required for processing signal or data from the integrator 24 and the comparator 26. The display 32 provides visual presentation of the output information provided by the microprocessor 30.

Referring to FIG. 1, when the sensor 22 is stressed by applying a load or force, the sensor 22 generates an output charge, which is subsequently converted to an output voltage. This output voltage is combined with the reference voltage provided by the reference voltage circuit 33. The integrator 24 and the comparator 26 respond to the output voltage from the sensor 22. The integrator 24 sends an input signal to the microprocessor 30. The comparator 26 acts as a window comparator to determine if the absolute value of the output voltage produced by the sensor 22 exceeds a pre-set value, such as an upper threshold limit or a lower threshold limit. Whenever the comparator 26 determines that the absolute value of the output voltage produced by the sensor 22 exceeds the preset value, the comparator 26 sends a signal to the microprocessor 30 which interprets the change in the output voltage as a change in the load on the sensor 22 and shifts the operating mode of the piezoelectric load sensor system 20 of the present invention from a storage mode to a measurement mode. In the measurement mode, the piezoelectric load sensor system 20 determines when the load measurement is stabilized (i.e., the applied force is no longer changing). When the piezoelectric load sensor system 20 determines that the load measurement is stabilized, the microprocessor 30 activates the feedback circuit 28 to provide a signal indicative of the last value of the measurement at the output of the integrator 24. The microprocessor 30 also presents the result of the load measurement to the display 32. When the piezoelectric load sensor system 20 determines that the applied force is changing and thus, the load measurement is not stabilized, the microprocessor 30 deactivates the feedback circuit 28 and the measurement process repeats.

Figure 2:
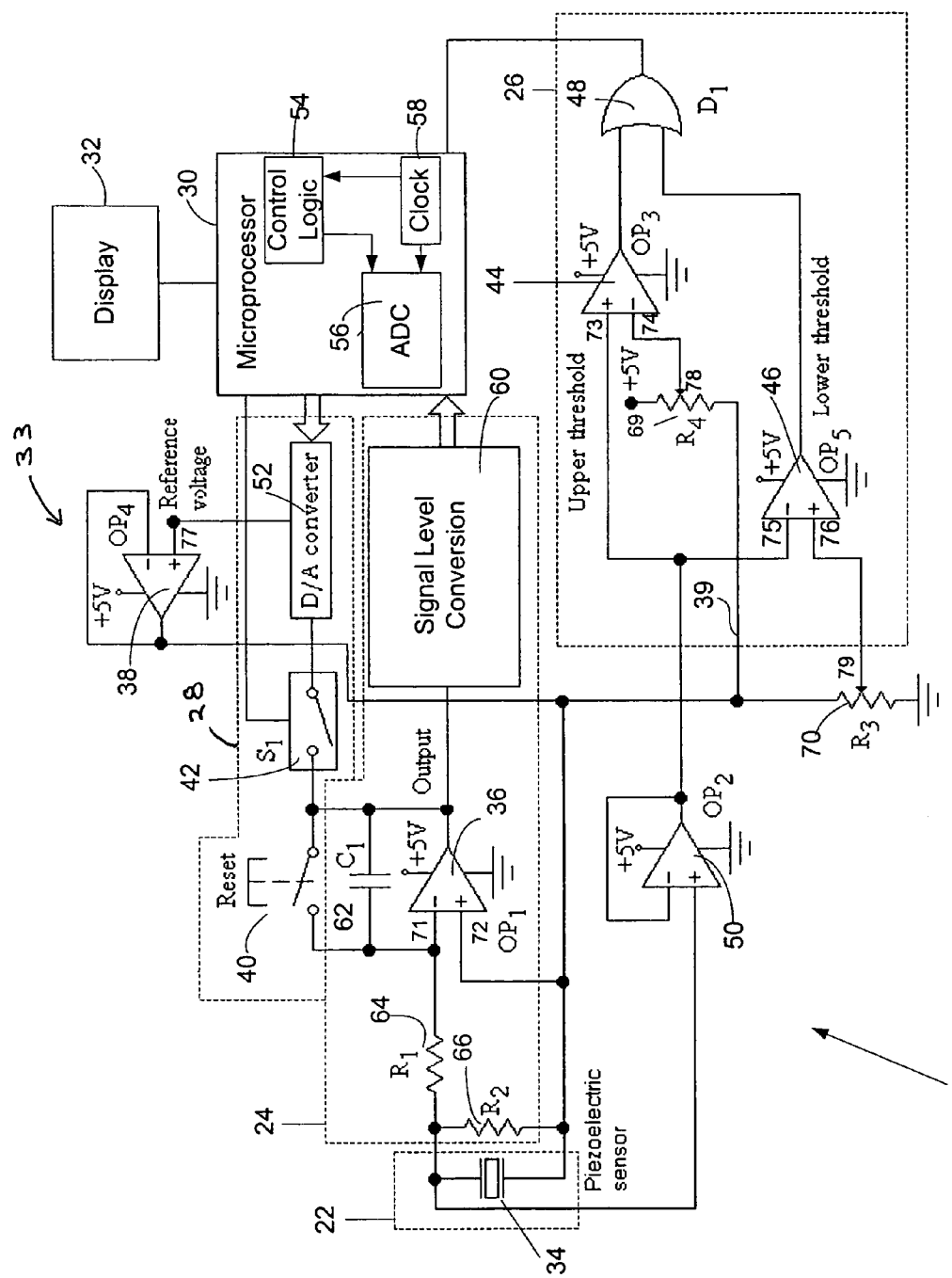
FIG. 2 is a simplified schematic diagram of the piezoelectric load sensor system of FIG. 1.

Referring next to FIG. 2, there is shown a functional schematic diagram of the embodiment shown in FIG. 1. The functional schematic diagram of FIG. 2 provides a more detailed understanding of the piezoelectric load sensor system 20 of the present invention. Major components of the piezoelectric load sensor system 20 include the sensor 22, the integrator 24, including an integrating operational amplifier (OpAm) 36 and a reset switch 40; the comparator 26, including a window comparator with an upper threshold OpAm 44, a lower threshold OpAm 46 and an OR gate 48; the feedback circuit 28 including a reset switch 40, a switch 42, and a digital-to-analog (D/A) converter 52; the reference voltage source 33, including a reference voltage OpAm 38; and the microprocessor 30.

As shown in FIG. 2, the sensor 22 portion of the piezoelectric load sensor system 20 includes a piezoelectric sensor 34. The output of the piezoelectric sensor 34 is connected to the input of the comparator 26 through unity gain OpAm 50, which is connected for operation as a voltage follower to provide an input signal for the comparator 26 portion of the piezoelectric load sensor system 20.

Various piezoelectric sensors are available which differentiate from each other by their piezoelectric constants, which determines the output charges that can be produced under a given mechanical load applied. The selection and preference of a piezoelectric sensor may be a matter of sensor sensitivity. Some of the piezoelectric sensors have higher or lower sensitivity to the temperature changes, which may be reflected in the pyroeffect (charge output due to temperature changes). As can be seen, the selection of a piezoelectric sensor for use with the present invention must be considered in view of the overall packaging design of the sensor package (protection against environmental influences), thus no particular product from a particular vendor is needed.

Although not shown, the piezoelectric sensor 34 can generally be made out of various materials, such as piezoelectric ceramic or polyvinylidene fluoride ("PVDF") film, which contains a backing material layer and a pushing layer. In such embodiments, the PVDF film can be laminated between the backing material (e.g., silicone rubber) and the pushing layer. The pushing layer can be fabricated of a plastic film whose side facing the PVDF film is preformed to have a corrugated surface. The piezoelectric sensor 34 is passive, which means that its output signal is generated by the mechanical load applied to it, without the need for an excitation signal.

The output of the piezoelectric sensor 34 is connected to a resistor 66, which discharges the sensor. The output of the piezoelectric sensor 34 is further connected to a resistor 64, which is a part of the integrator 24. The integrator 24 comprises the resistor 64, capacitor 62, and OpAm 36. The resistor 64 is connected to an inverting input 71 of the integrator OpAm 36. The output of the reference voltage OpAm 38 is connected to a noninverting input 72 of the integrator OpAm 36. A capacitor 62 is connected between the output and the inverting input 71 of the integrator OpAm 36. A reset switch 40 is connected in parallel with the integrating capacitor 62. The output of the integrator OpAm 36 is also connected to an input of a signal level conversion circuit 60.

The integrator 24, the comparator 26, and the feedback circuit 28 of the present invention may include converters ranging from discrete circuits, to monolithic integrated circuits (ICs), to high-performance hybrid circuits and modules. The signal level converter 60 adjusts the voltage output signal from the integrator 24, and, in conjunction with comparator 26, sends this signal to the analog-to-digital converter 56 (ADC) residing within the microprocessor.

The window comparator 26 includes a comparator operational amplifier 44 (the upper threshold comparator), a comparator operational amplifier 46 (the lower threshold comparator) and the OR gate 48. OpAm 44 and OpAm 46 are connected for operation as a window comparator which monitors the output voltage from the piezoelectric sensor 34 and causes the OR gate 48 to change state (e.g., shift from a logic 0 indicating low output voltage to a logic 1 indicating high output voltage), when the output voltage from the piezoelectric sensor 34 exceeds the upper or lower voltage limit set by the window comparator 26. A potentiometer R4 establishes the upper threshold for the window comparator via the OpAm 44. OpAm 44 has a non-inverting input 73 connected to the output of OpAm 50 and an inverting input 74 connected to a tap 78 of the potentiometer R4 which is connected between +V and via conductor 39 to the output of the reference voltage OpAm 38 to receive the variable reference voltage. The output of the OpAm 44 is connected to one input of the OR gate 48.

Similarly, a potentiometer R3 establishes the lower threshold for the window comparator 26 via the OpAm 46. The OpAm 46 has a non-inverting input connected to the output of the OpAm 50 and an inverting input connected to a tap 79 of the potentiometer R3 which is connected between the conductor 39 at the output of the reference voltage OpAm 38 and ground. The output of the OpAm 44 is connected to another input of the OR gate 48. The output of the OR gate 48 is connected to an input of the microprocessor 30.

Whenever the voltage provided by the OpAm 50 is within the window established by the upper threshold OpAm 44 and the lower threshold OpAm 46, the output of the comparator is a logic low level. If, on the other hand, the voltage provided by the OpAm 50 in not within the window established by the window comparator 26, the output of the OR gate 48 becomes a logic high level.

Referring now to the feedback circuit 28 portion of the piezoelectric load sensor system 20. A switch 42 is connected between an output of the digital-to-analog (D/A) converter 52 and the output of the integrator 24. The D/A converter 52 has an input connected to an output of the microprocessor 30. The D/A converter 52 also has an output connected to the noninverting input 77 of the reference voltage OpAm 38.

The D/A converter 52 sets a zero-line or baseline reference voltage for the reference voltage OpAm 38. In one aspect, the zero-line reference voltage applied to a input 77 of the reference voltage OpAm 38 is preferably about 2 Volts DC. In this aspect, for a zero change in the load input, the output of the reference voltage OpAm 38 is maintained at about 2 Volts DC. This reference line voltage varies during operation as a function of static load change. Any load applied to the sensor 22 would result in an increase of the output voltage which is added to the 2 Volts DC reference voltage provided by the reference voltage OpAm 38.

Referring now to the microprocessor 30 of FIG. 2, the microprocessor 30 includes a control logic 54, an analog to digital converter (ADC) 56 and a clock 58. An output of the microprocessor 30 is connected to the display 32. The ADC 56 transforms an analog signal, preferably voltage, into an equivalent digital signal, compatible with the microprocessor 30. Generally, the integrator 24 converts a voltage input from the sensor 22 into a function of time, then the time function is converted into a digital number by the ADC 56 residing in the microprocessor 30.

Referring still to FIG. 2, the integrator OpAm 36 receives the input voltage from the piezoelectric sensor 34 at the inverting input 71 via the resistor 64. The integrator OpAm 36 receives the reference voltage from the reference voltage OpAm 38 at a noninverting input 72. The integrator OpAm 36 produces a signal for the signal level conversion 60 and then the control logic 54 of the microprocessor 30 when the output voltage of the piezoelectric sensor 34 crosses zero (i.e., exceeds the zero-line reference voltage). The microprocessor 30 controls the switch 42. When the voltage reaches the threshold set by the upper threshold OpAm 44 or the lower threshold OpAm 46, the microprocessor opens switch 42, which shifts the integrator 24 from storage mode to measurement mode. The switch 40 provides an additional means to manually discharge the capacitor 62. In an embellishment the switch 40 may be controlled by the microprocessor 30.

In operation, the PVDF film of the piezoelectric sensor 34 is stressed by the corrugated surface by applying a load or force to the pushing layer. The PVDF film then generates an electric charge that flows out of the PVDF film through a current-to-voltage converter, which produces variable output voltage to activate the alert circuitry. The amplitude of the variable output voltage is proportional to the applied force.

When an output signal, produced (e.g., a load is detected) from the piezoelectric sensor 34, is detected by the window comparator 26, the OpAm 44 (the upper comparator) and the OpAm 46 (the lower comparator) detect when the absolute value of the output of the piezoelectric sensor 34 exceeds a predetermined value. Such a change is interpreted as a change in the load, and subsequently, will shift the piezoelectric load sensor system 20 from the storage mode to the measurement mode.

The integrator 24 (like all integrators built using realistic integrated circuits) suffers from low frequency drift due to circuit noise, capacitor leakage, finite op-amp input impedance, etc. The present invention reduces the effect of the drift on the output voltage. This is accomplished by "freezing" the output of the microprocessor 30 when the piezoelectric sensor 34 does not detect a change in the mechanical load, and allowing the piezoelectric load sensor system 20 to follow any load fluctuations when the load does change.

Determining when to shift the piezoelectric load sensor system 20 between the measurement mode and the storage mode is predicated on determining what piezoelectric sensor voltage is to be interpreted as a consequence of load, and what voltage is to be neglected as noise. It is apparent that this depends on the circuit configuration, shielding arrangement, the settings of potentiometers 69 and 70, etc. Generally, the narrower the detection window provided by the window comparator 26, the smaller the load change that is needed to be detected by the piezoelectric sensor 34 to trigger the measurement mode, and the lower the noise in the mechanical load needed that would shift the circuit into measurement mode undesirably.

Returning to the operation of the piezoelectric load sensor system 20, when an output signal is produced by the piezoelectric sensor 34, the integrator OpAm 36 sends an input signal to the control logic 54 of the microprocessor 30 to start a timer at the clock 58. Preferably, the timer at the clock 58 is preset to define a fixed time interval. During that time interval, the integrator OpAm 36 integrates the output signal from the piezoelectric sensor 34. The output signal from the piezoelectric sensor 34 does not have to be constant. Any variations in the output signal are averaged during the integration process.

At the end of the time interval, the output voltage of the integrator OpAm 36 reaches a certain level. If the load is still changing, as indicated by a high level at the output of the OR gate 48, the microprocessor will keep the circuit in the measurement mode by maintaining open switch 42. If, on the other hand, the load has stabilized, the output of the OR gate 48 will go low, and the microprocessor will close switch 42, shifting the piezoelectric load sensor system 20 from measurement mode to the storage mode.

More particularly, in one embodiment without limitation, during the de-integrate phase, the ADC 56 counts clock pulses. When the comparator 26 portion indicates a change in the load via the output of the OR gate 48, the count is stopped and the integrator OpAm 36 is reset by discharging the integrating capacitor 62 through the reset switch 40. The charge at the integrating capacitor 62 gained during the input signal integrate phase is precisely equal to the charge lost during the reference de-integrate phase.

Therefore, the ratio of the average input voltage and the reference voltage is equal to the ratio of the two time intervals. Then the ADC 56 does the next step by converting the time interval into a digital form by counting the pulses of the clock 58 during the time interval. The total count is the measure of the average input voltage in which the reference voltage and the preset timer are constants.

Figure 3:
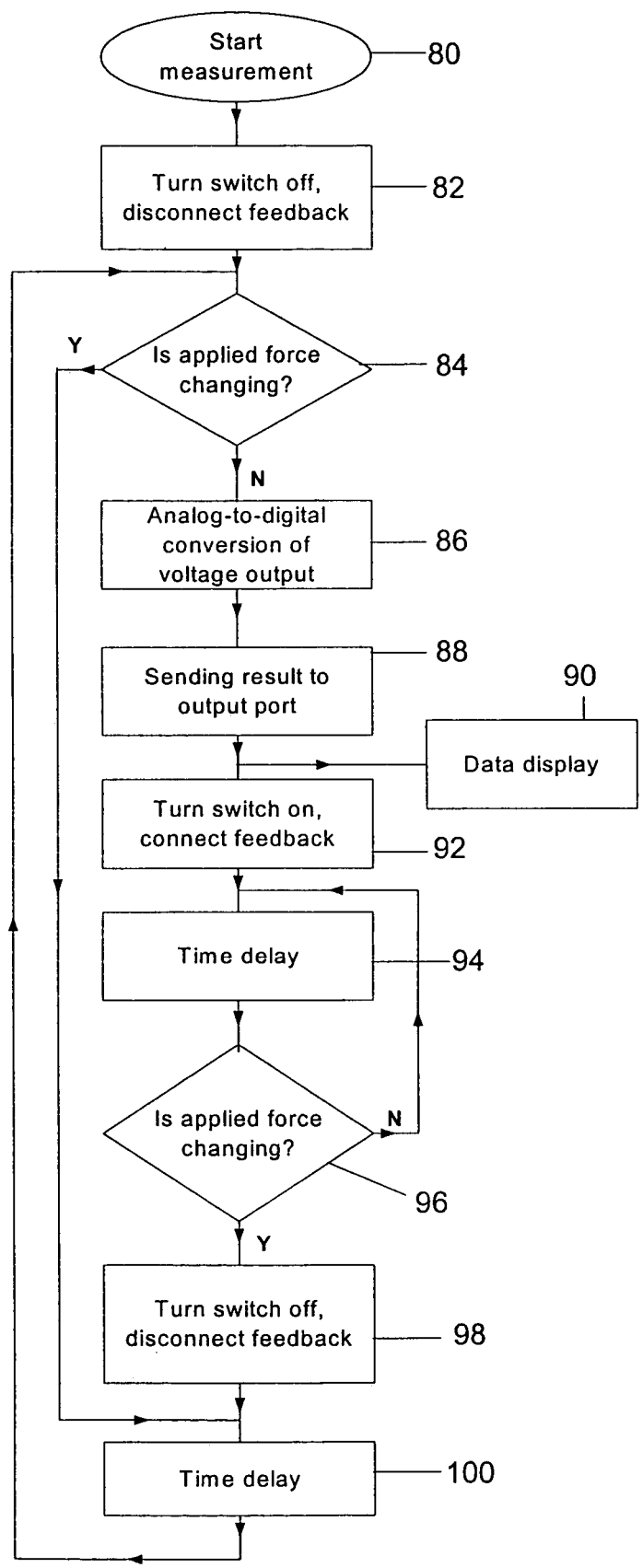
FIG. 3 is a flowchart illustrating the measurement steps of the piezoelectric load sensor system.

Referring now to FIG. 3, there shown a flowchart illustrating the measurement steps of the piezoelectric load sensor system 20 of the present invention. The load measurement process starts at a start measurement step 80. At a disconnect feedback step 82, the switch 42 (FIG. 2) of the feedback circuit 28 (FIGS. 1–2) is turned off, thereby disconnecting the feedback loop of the piezoelectric load sensor system 20. Next, at an applied force decision step 84, the piezoelectric load sensor system 20 determines whether the applied force is changing. If the applied force decision step 84 determines that the applied force is changing, the flow proceeds to a time delay step 100 in which a time delay is implemented and the process loops the measurement procedures back to the applied force decision step 84 to determine whether the applied force is changing.

The time delay at the time delay step 100 is introduced in order for the present invention to work properly when the load changes, e.g. when a static force is applied to or removed from the sensor 22. The piezoelectric load sensor system 20 of the present invention can be operating in the measurement mode, and the switch 42 of the present invention is activated while the load changes. This is triggered by the microprocessor 30, which checks the output of the window comparator 26 that detects the output voltage of the piezoelectric sensor 34.

Once a load change has been detected, the circuit of the present invention will keep the switch 42 open for a certain period of time until the load settles. This ensures that little ripples in the output of the piezoelectric sensor 34 would not operate the switch 42 on and off, thus disabling the measurement function during the operation. The present invention operates in the measurement mode during the delay, and thus low frequency drift will be added to the signal. However, the less time the present invention spends in the measurement mode, the less impact the drift will have. Therefore, in preferred embodiments, the smallest value that made the static load measurement possible should be selected.

Referring back to FIG. 3, when the applied force decision step 84 determines that the applied force is not changing, then the process moves to an analog-to-digital conversion step 86 in which an A/D conversion of the voltage output of the signal level converter is performed. The result of the A/D conversion from the analog-to-digital conversion step 86 is sent to an output port of the microprocessor 30 (FIG. 2) at a sending result step 88. The microprocessor 30 then presents the result at a data display step 90 and turns on the switch 42 (FIG. 2) at a turn on switch step 92 to connect the feedback loop of feedback circuit 28 to the output of the integrator 24. Then, step 94, a time delay, is implemented before the process moves on to an applied force determination step 96 to determine whether the applied force is changing. If the applied force determination step 96 determines that the applied force is not changing, the process loops back to the time delay step 94. If the applied force determination step 96 determines the applied force is changing, then the microprocessor 30 turns off the switch 42 to disconnect the feedback loop of the feedback circuit 28 at a turn switch off step 98. The process then moves to the time delay step 110 in which the measure measurement process of the present invention repeats.

Figure 4:
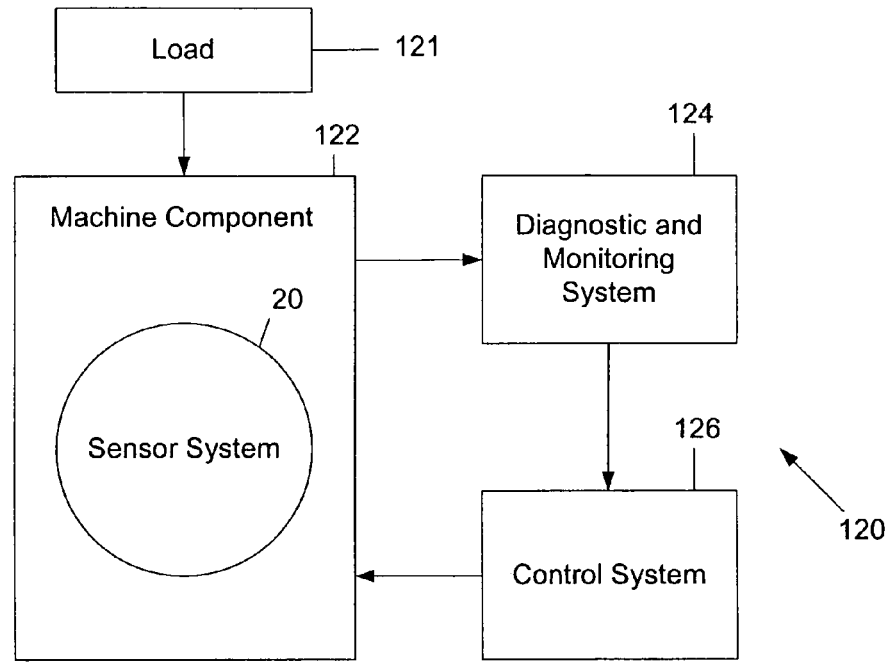
FIG. 4 is a block diagram of an embellishment of the present invention in which the piezoelectric load sensor system is integrated into a condition monitoring system.

Referring to FIG. 4, the present invention can be used as a part of a larger system which may incorporate other detectors, signal conditioners, signal processors, memory devices, and actuators. The present invention can be positioned or incorporated at the input of a condition monitoring system 120 to perceive the outside effects and to signal the system about variations in the outside stimuli. For example, the piezoelectric load sensor system 20 can provide condition monitoring of components of a machine by integrating with a machine component 122 to function as a static load measurement that provides accurate, realistic, and quasi real-time loading information for the machine component 122. Alternatively, the present invention may be an internal part of a device or the machine component 122 for respective monitoring the state thereof. This internal monitoring can be used to check on the performance. The built-in capabilities of the piezoelectric load sensor system 20 are useful in realizing the next generation "smart" machine components in which the machine component 122 can be connected to a diagnostic and monitoring system 124 and a control system 126 that can self-diagnose the working condition of monitoring system 120 for condition-based preventative and predictive maintenance. The condition monitoring system 120, assisted by the piezoelectric load sensor system 20 of the present invention and the diagnostic and monitoring system 124, helps reduce costly machine down-time, and improve enterprise-wide decision making, scheduling, and productivity.

Figure 5:
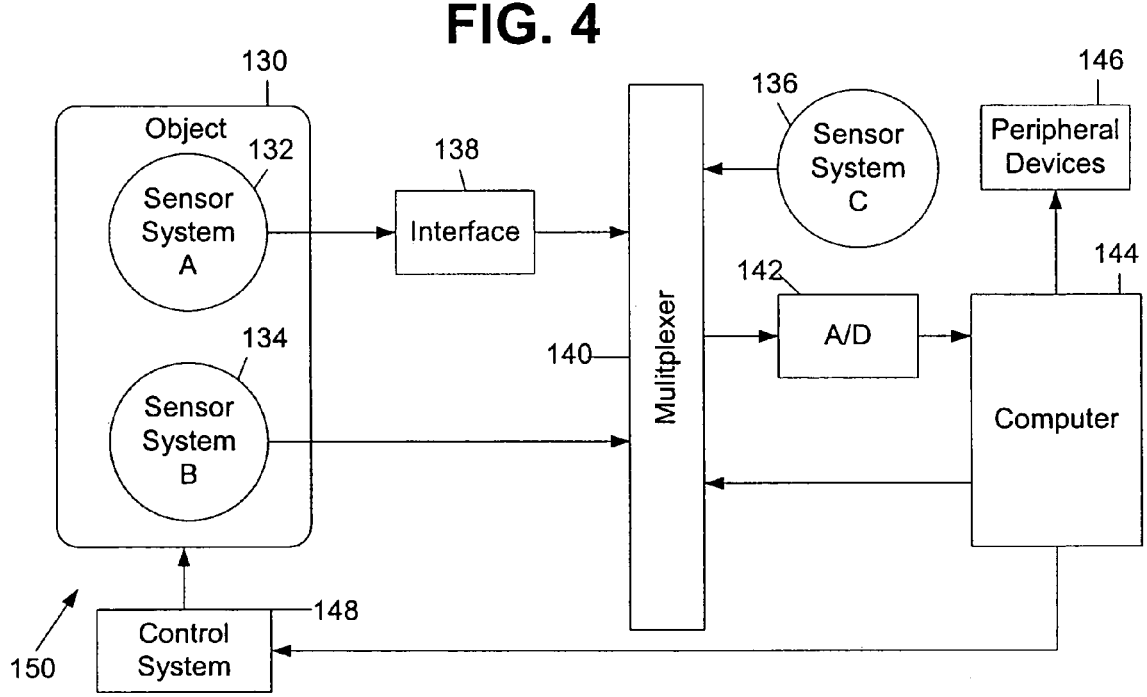
FIG. 5 is a block diagram of an alternative embodiment of the present invention in which the piezoelectric load sensor system is integrated into a larger system with other data acquisition and control devices.

In an embellishment, as shown in FIG. 5, the present invention can be part of a data acquisition system 150 that may be a part of a larger sensing system which includes various feedback mechanisms. In this example, the data acquisition system 150 uses three passive sensor systems (A, B, and C) 132, 134, and 136, respectively, to monitor, for example, loading status on an individual object 130. These passive sensors generate electric signals without energy from the data acquisition system 150. The sensor system A 132, residing or near object 130, can be connected to an interface 138 for signal conditioning before being multiplexed by a multiplexer 140. The sensor system B 134, also used to monitor object 130, can be directly connected to the multiplexer 140. The sensor system C 136 is also connected directly to multiplexer 140, but is used, for example, to monitor the internal conditions of the data acquisition system 150. The electrical signals from the sensors 132, 134, and 136 are fed to the multiplexer 140 which connects the sensors 132, 134, and 136, one at a time, to an A/D converter 142 or directly to a computer 144.

Generally, similar to the overall architecture of the preferred embodiment as shown in FIG. 1, the multiplexer 140 of the data acquisition system 150 can be connected to the A/D converter 142 with the computer 144 controlling the processing of the multiplexer 140, the A/D converter 142, in addition to a control system 148 and other peripheral devices 146 (e.g., a data recorder, a display, an alarm, etc.). The computer 144 also controls the multiplexer 140 and A/D converter 142 for appropriate timing. The computer 144 also sends control signal to the feedback system 148 to act on the object 130. With a computerized system, the data acquisition system 150 can be used to oversee an entire machine system (e.g., multi-axis machine centers, power generators, off-highway trucks, excavators, railway trains or airplanes) or a manufacturing process (e.g., assembly line, chemical process, natural gas production, or oil refinery).

Referring to FIGS. 4–5, the data acquisition system 150 and condition monitoring system 120 can, for example, establish a better match between the actual loads and the load-carrying capabilities of the components, through selection of different product sizes, types, heat treatment methods, etc. For example, an overload detected during the applications by the integrated load measurement device can provide clues and suggest related solutions to flaws that can be traced back to the design, material selection, manufacturing, packaging, and transportation stages of the products (e.g., using a different steel alloy or adding ultrasonic inspection at the manufacturing stage).

It may therefore be appreciated from the above detailed description of certain, non-limiting embodiments of the present invention that it provides a system and method for measuring static load by using a piezoelectric load sensor with a feedback technique to compensate for the signal loss and ensures measurement accuracy. The system of the present invention may be used to measure static loads applied to a mechanical shaft, in an on-line, in-process, quasi real-time fashion. The piezoelectric load sensor system of the present invention may be structurally integrated, preferably through miniaturization, into a variety of machine components, structures, and other computerized sensing systems.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

EXAMPLES OF THE INVENTION

The following non-limiting examples and data illustrate various aspects and features relating to the apparatus, systems and/or methods of the present invention. In comparison with the prior art, the present apparatus, systems and/or methods provide results and data which are surprising, unexpected and contrary thereto. While the utility of this invention is illustrated through the use of several systems or circuits and electronic components which can be used therewith, it will be understood by those skilled in the art that comparable results are obtainable with various other systems/circuits and components, as are commensurate with the scope of this invention.

Example 1

Figure 6:
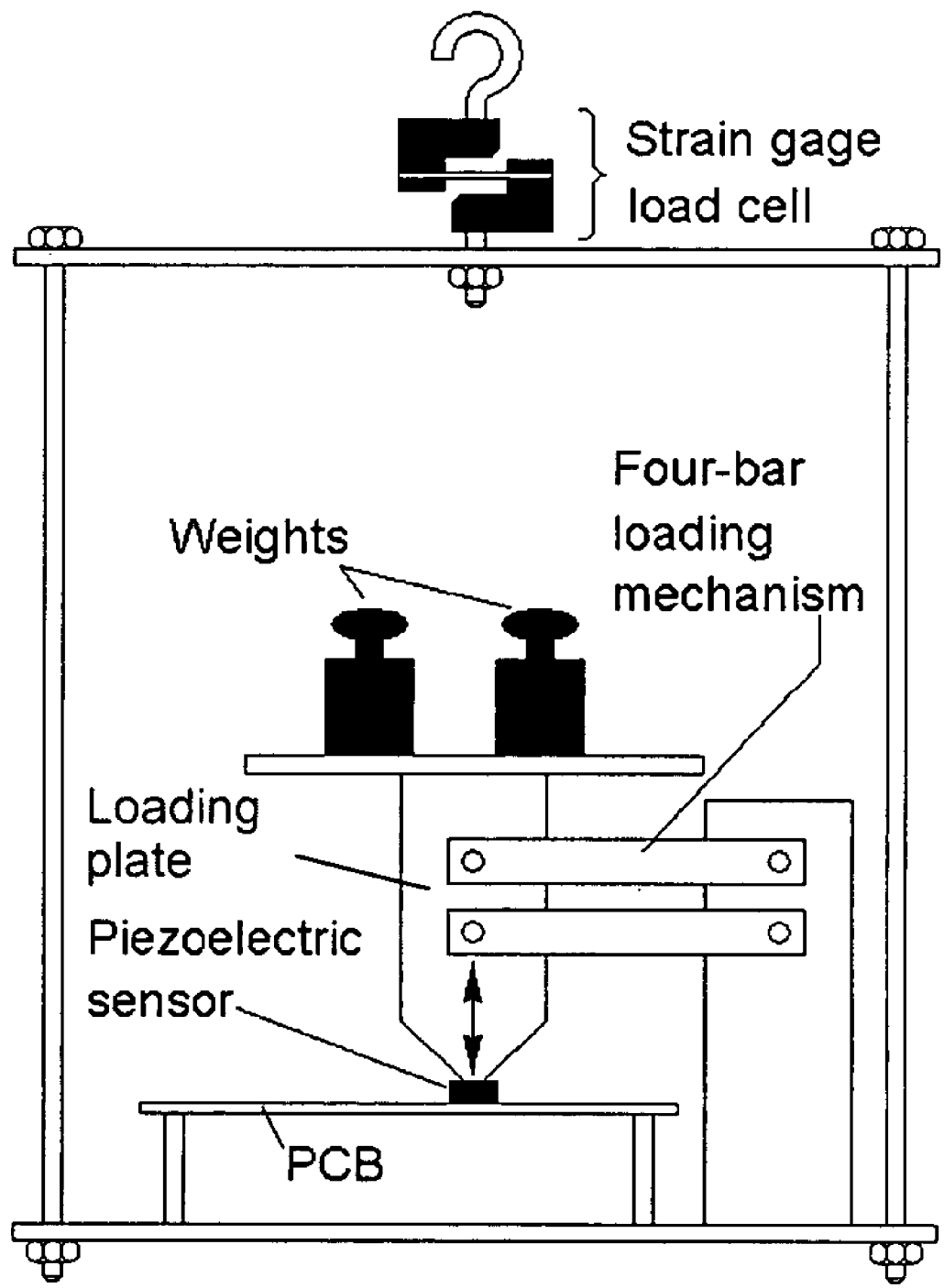
FIG. 6 shows an apparatus/system for measurement of static load, in accordance with this invention.

As illustrated in FIG. 6, a piezoelectric sensor system in accordance with this invention, was mounted on a printed circuit board (PCB). The sensor itself was subject to the force application by means of standard weights, through a four-bar rectangular planar mechanism, which constrained the motion of the scale plate holding the weights to a vertical linear displacement. The plate supporting the PCB and the four-bar mechanism was suspended by wires. For comparison and reference purpose, a strain gage load cell of the prior art was installed along the suspension hook. Due to the series mechanical connection, the strain gage load cell measured the same load as the piezoelectric sensor, thus realizing a "back-to-back" calibration basis. Output signals from the two load measuring systems (strain gage and piezoelectric sensor) are comparatively shown on the plots that follow.

The strain gage circuit was first calibrated using standard weights before the experiment. As a result, the bias in output due to strain gage preloading from the suspended system was removed, and the gain of the strain gage amplifier was set to equate 1 Volt output with 1,000 g load. Similarly, the output of the piezoelectric sensor was first calibrated experimentally. The data was acquired by a National Instrument data acquisition system, at a sampling frequency of 100 Hz.

Three loading tests were conducted:
  a) Constant load test: known weight was placed on the sensor for a certain period of time. The output of the piezosensor was expected not to change, in order to verify its ability in measuring static force. See Example 2.
  b) Toggled load test: known weight was placed on the sensor, then removed, and placed back again, to verify the repeatability of the circuit. See Example 3.
  c) Continually-changing load test: a container was placed on the sensor, and water was poured into it from above through a plastic hose. Then a 500 g weight was placed on the scale plate. Then the container was slowly drained by opening a valve at the bottom, and finally, the 500 g weight was removed. See Example 4.

Example 2

Constant Load Test

Figure 7:
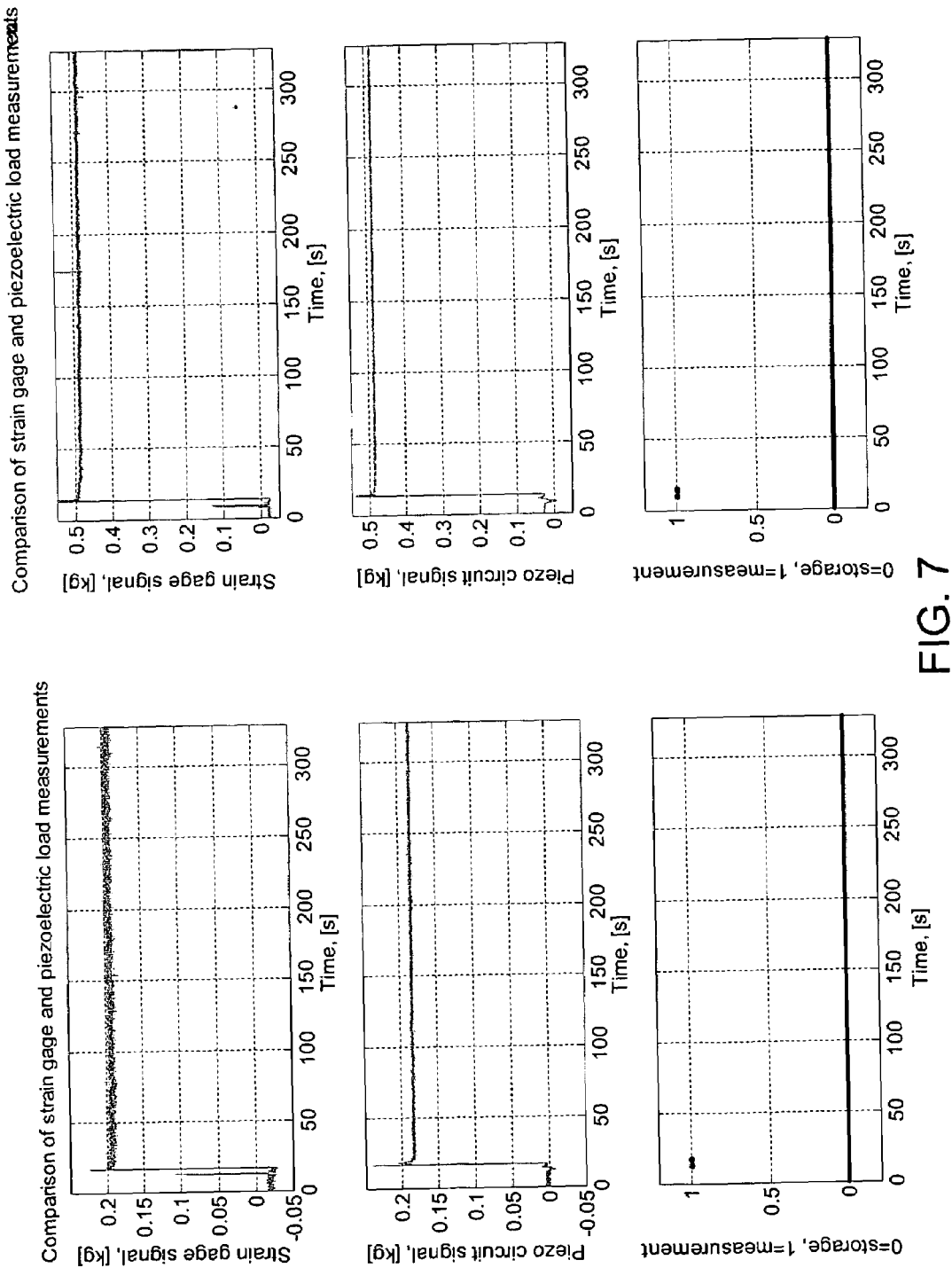
FIG. 7 shows graphic plots comparing piezoelectric sensor output with strain gauge measurements of the prior art.

The plots of FIG. 7 shows the circuit output when weights of 200 g (left) and 500 g (right) were applied to the sensor. The piezoelectric sensor (middle) was able to deliver a constant voltage output corresponding to the weight applied. The output is comparable to that of the strain gage sensor (top). The bottom portion of the figure illustrates the circuit trigger.

Example 3

Toggled Load Test

The toggled load tests were aimed at demonstrating the repeatability of the measurement using the inventive piezoelectric sensor/system.

Figure 8:
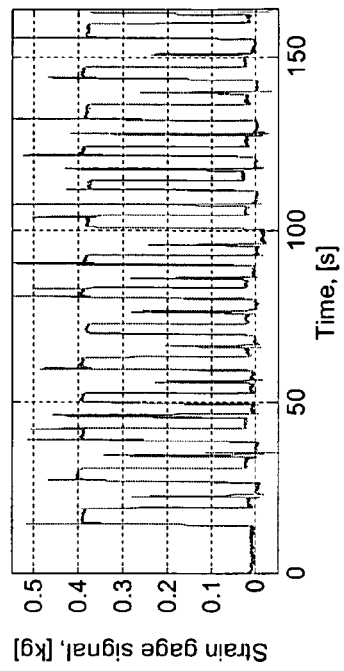
FIG. 8 provides graphic representations demonstrating reproducibility of the piezoelectric sensor measurements of this invention.
Figure 8:
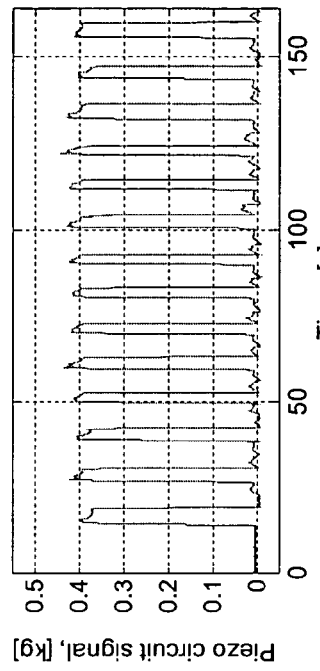
Figure 8:
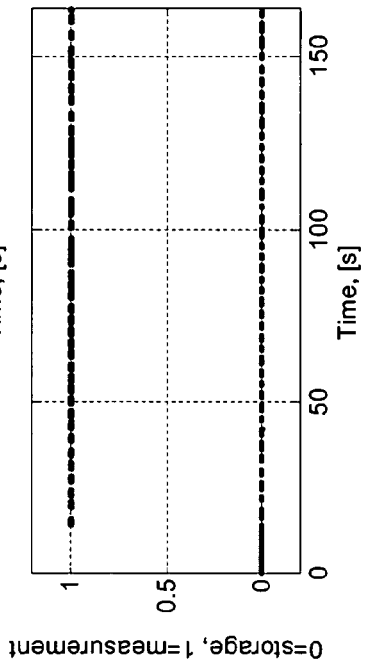
Figure 8:
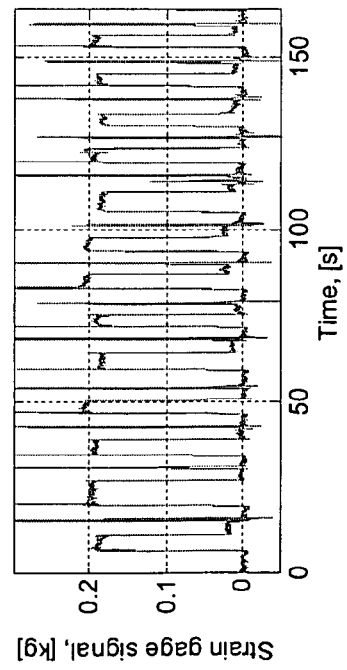
Figure 8:
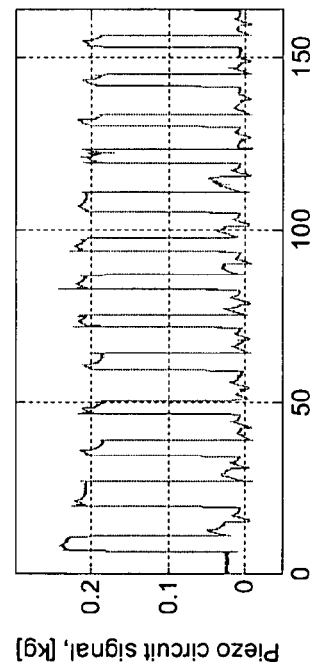
Figure 8:
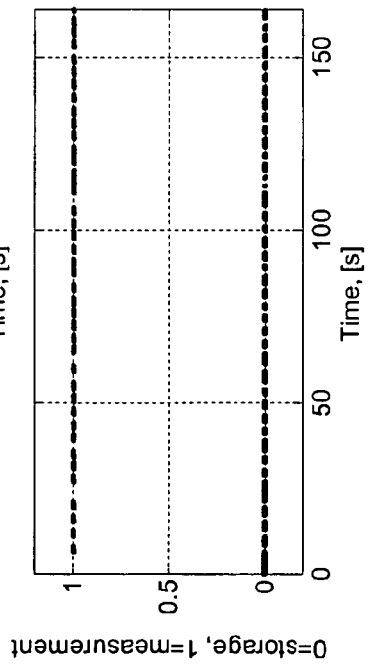

As seen in FIG. 8, the piezoelectric circuit has shown good repeatability when known weights (220 g, left, and 400 g, right) were repeatedly placed on the sensor, taken away, and then put back on again. Comparing to the strain gage circuit output, the piezoelectric sensor has shown less to much less spikes at the load-unload interfaces.

Example 4

Continually-Changing Load Test

For this test, water was poured through a plastic hose into a container that was placed on top of the sensor. A 500 g weight was added to the sensor. The container was drained through a valve at the bottom of the container, and the 500 g weight was removed.

Figure 9:
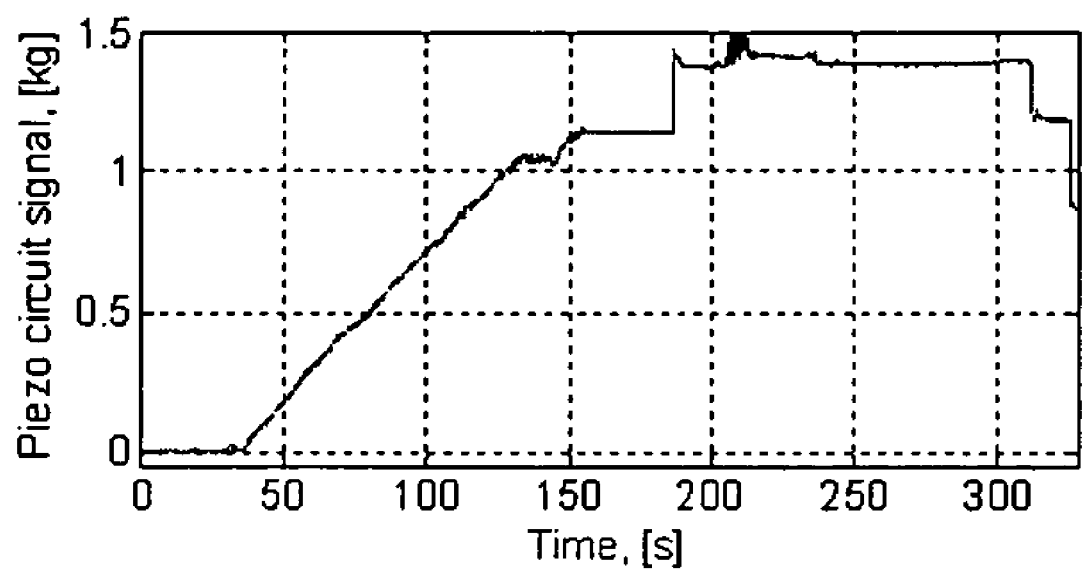
FIG. 9 graphically demonstrates measurement accuracy over the course of changing static load.

As shown in FIG. 9, the circuit has shown to be able to follow the load change truthfully.

Overall, the measurement has the following performance, using 500 g weight as the full scale range:

Absolute error: 7.3 g
Relative error: 1.46%
Standard deviation: 7.9 g

We claim:

1. A system for measuring static load applied to a mechanical support component, said system comprising:
a piezoelectric sensor;
a discharge resistor connected directly in parallel with said piezoelectric sensor, said piezoelectric sensor generating a charge when stressed in response to a static load on the mechanical support component, thereby producing an analog voltage across said discharge resistor;
electronic circuitry for converting said analog voltage to a digital value, said electronic circuitry including an integrator for integrating the analog voltage across the discharge resistor with respect to time to provide the time integral of the analog voltage across the discharge resistor, the static load on the mechanical support being measured being proportional to the time integral of the analog voltage across the discharge resistor;
said discharge resistor discharging said piezoelectric sensor; and
a feedback circuit to compensate for decay drift of said analog voltage.

2. The system of claim 1 wherein said electronic circuitry further comprises a processor including an analog to digital converter, and wherein said digital value is representative of the applied static load.

3. A system for measuring static load applied to a mechanical support component, said system comprising:
a piezoelectric sensor for generating an analog electrical signal responsive to a static load on a mechanical support component;
electronic circuitry for converting said analog electrical signal to a digital value; and
a feedback circuit to compensate for decay of an analog electrical signal, wherein said electronic circuitry comprises a processor, said processor comprising an analog to digital converter for converting said analog signal to a digital value representative of the applied static load, a comparator for detecting said analog electrical signal produced by said sensor, and an integrator for integrating said analog electrical signal over time.

4. The system of claim 3 wherein said feedback circuit comprises a switch interposed between an output of said processor and an output of said integrator.

5. The system of claim 4 wherein said feedback circuit comprises a digital to analog converter for converting the digital value produced by said processor to an analog value.

6. The system of claim 3 wherein said comparator comprises a window comparator defining upper and lower limit values for said analog signal.

7. The system of claim 1 further comprising a reference source for providing a reference voltage for said electronic circuitry.

8. A system for measuring static load applied to a mechanical support component, said system comprising:
a piezoelectric sensor for generating an analog electrical signal responsive to a static load on a mechanical support component;
electronic circuitry for converting said analog electrical signal to a digital value, said electronic circuitry including an integrator for integrating said analog electrical signal over time and a processor including an analog to digital converter;
a reference source for providing a reference voltage for said electronic circuitry; and
a feedback circuit to compensate for decay of an analog electrical signal, wherein said feedback circuit comprises a switch interposed between an output of said processor and an output of said integrator.

9. The system of claim 1 further comprising a display unit for displaying a value indicative of the applied static load.

10. The system of claim 1 wherein said piezoelectric sensor is disposed on a mechanical support component.

11. A method for static load sensing, said method comprising:
providing a piezoelectric sensor for generating an analog signal responsive to a static load on said sensor, said sensor coupled to electronic circuitry for converting said analog signal to a digital value, said sensor producing a first reference voltage;
changing the static load on said sensor, said sensor generating a voltage responsive to said change in static load;
comparing said generated voltage with predetermined first upper and lower voltage values; and
applying said generated voltage to said first reference voltage and to said first upper and lower voltage values.

12. The method of claim 11 comprising integration of said generated voltage over time.

13. The method of claim 11 further comprising conversion of said integrated voltage to a digital signal, and storage of said digital signal.

14. The method of claim 11 wherein the amplitude of said generated voltage is outside said first upper and lower voltage values, said application providing a second reference voltage and second upper and lower voltage values.

15. The method of claim 14 comprising integration of said generated voltage over time using an integrator circuit, conversion of said voltage to a digital value and storage of said value.

16. The method of claim 15 comprising feeding back a signal corresponding to said digital value to an output of said integrator circuit.

17. A method of using a piezoelectric signal to counter signal decay, said method comprising:

providing a piezoelectric sensor for generating an analog signal responsive to a change of static load on a mechanical support, said sensor coupled to electronic circuitry for converting the time integral of said analog signal to a digital value;

changing the static load on said sensor, said sensor generating a voltage responsive to said change in said static load;

integrating said generated voltage over time using an integrator circuit of said electronic circuitry to produce an integrated voltage;

converting said integrated voltage to a digital value;

storing the digital value;

producing a feedback signal corresponding to said digital value; and coupling said feedback signal to an output of said integrator circuit.

18. The method of claim 17 including displaying said digital value on a display unit.

19. The method of claim 17 including operating said electronic circuit in a measurement mode to convert said analog signal produced by said sensor to a digital value, and operating in a storage mode to display said digital value on said display unit, and switching from said storage mode to said measurement mode responsive to a change in static load.

20. A method for static load sensing, said method comprising:

providing a piezoelectric sensor for generating an analog signal responsive to a static load on said sensor, said sensor coupled to electronic circuitry for converting said analog signal to a digital value;

changing the static load on said sensor, said sensor generating a voltage responsive to said change in static load;

comparing said generated voltage with predetermined upper and lower voltage values; and integrating said generated voltage with respect to time to obtain a signal that depends linearly on the load.

21. The method of claim 20 including determining when the amplitude of said generated voltage is outside a range between upper and lower voltage values, and shifting from a storage mode to a measurement mode for a predetermined time whenever said generated voltage is outside said range.

22. A method of using a piezoelectric signal to counter signal drift, said method comprising:

providing a piezoelectric sensor for generating an analog signal responsive to a change of static load on a mechanical support, coupling said piezoelectric sensor to electronic circuitry for converting the time integral of said analog signal to a digital value;

changing the static load on said sensor, said sensor generating a voltage responsive to said change in said static load;

using an integrator circuit to integrate said voltage over time in a measurement mode to produce an integrated voltage that has a linear relationship with the load;

converting said integrated voltage to a digital value;

storing the digital value;

producing a feedback signal corresponding to said digital value; and coupling said feedback signal to an output of said integrator circuit in a storage mode.

23. The method of claim 22 including operating in a measurement mode to time integrate said analog signal produced by said sensor and convert the result of the time integration into a digital value, operating in a storage mode to display said digital value on said display unit and to couple an analog signal corresponding to said digital value to the output of the integrator for drift compensation, and switching from said storage mode to said measurement mode in response to a change in static load.

24. A system for measuring static load applied to a mechanical support component, said system comprising:

a piezoelectric sensor for generating an analog electrical signal responsive to a static load on a mechanical support component;

electronic circuitry for obtaining the time integral of said analog electrical signal and for converting the time integral of said analog electrical signal to a digital value; and a feedback circuit to compensate for drift of said analog electrical signal, wherein said electronic circuitry includes an integrator for integrating said analog electrical signal over time to provide said time interval of said analog electrical signal, a processor and an analog to digital converter for converting the time integral of said analog signal to a digital value representative of the applied static load, and a window comparator for detecting whether or not said analog electrical signal produced by said sensor is within a predetermined range.

* * * * *